(No Model.)
A. R. LEEDS.
APPARATUS FOR PURIFICATION OF WATER.
No. 296,337. Patented Apr. 8, 1884.
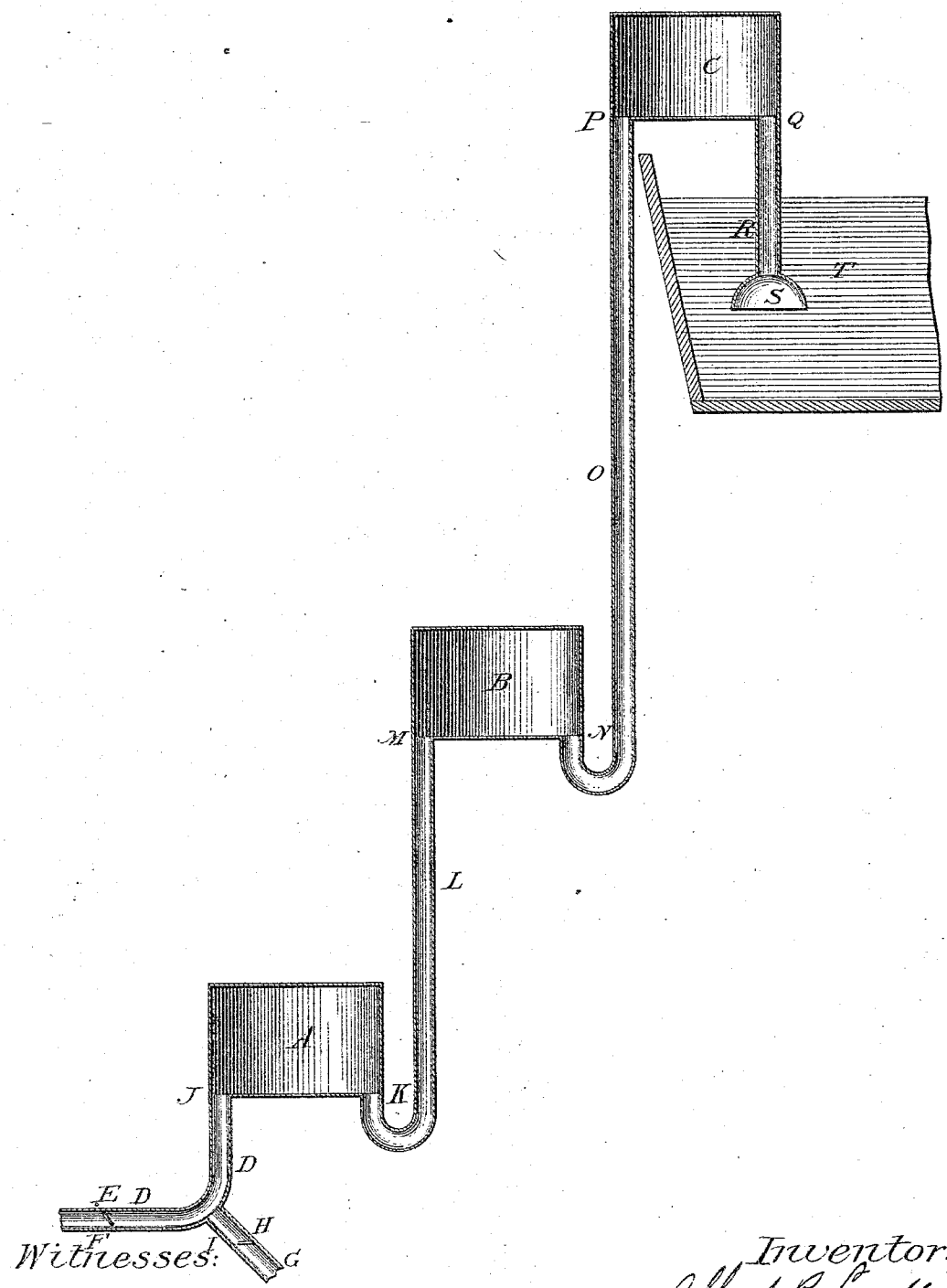

UNITED STATES PATENT OFFICE.

ALBERT R. LEEDS, OF HOBOKEN, NEW JERSEY.

APPARATUS FOR THE PURIFICATION OF WATER.

SPECIFICATION forming part of Letters Patent No. 296,337, dated April 8, 1884.

Application filed September 17, 1883. (No model.)

*To all whom it may concern:*

Be it known that I, ALBERT R. LEEDS, a citizen of the United States, residing at Hoboken, in the county of Hudson and State of New Jersey, have invented a new and useful Apparatus for the Purification of Water, of which the following is a specification.

My invention relates to an apparatus that will utilize the discovery that when water and air are both under high pressure in contact with one another and both in motion, the water will absorb the oxygen of the air with great rapidity, and will thereby be kept chemically pure.

I am aware that the purification of water has been attempted by aeration, the air being pumped into the still water of a reservoir and allowed to rise through it. Such devices are shown in the patent of Collins, May 3, 1881, No. 240,813, and that of D'Heureuse, February 28, 1871, No. 112,226; but in these apparatus the water is not in motion and not under pressure, and the air, although under pressure in the tubes, is released from pressure at the moment of its contact with the water.

The object of my invention, therefore, is to accomplish the rapid purification of water by causing the air under pressure and in motion to be brought into contact in one or more close chambers with water under pressure and in motion. I attain these objects by means of the apparatus illustrated in the accompanying drawing, which represents a vertical longitudinal section.

A, B, and C are a series of close chambers connected together and discharging into the reservoir T, and rising consecutively between the source of water-supply and the reservoir. In each of these chambers, as well as in the pipes connecting the same, the air and water are brought into contact under great pressure.

D is the source of water-supply, having a valve, E, opening toward the chamber A and closing upon the valve-seat F. This valve, E, should be at the lowest curve of the supply-pipe D, and at a point before the water has reached the inlet of the air-supply pipe G. At a point somewhat higher than the valve E, and between said valve E and the pressure-chamber A, is introduced the air-supply pipe G, said air-supply pipe being connected with a reservoir of compressed air or with an air-pump. The air-supply pipe G also has a valve, H, opening toward the water-supply pipe D and closing on the valve-seat I.

The chambers A, B, and C may be formed of cylindrical or other suitable shape; but their outlets K, N, and Q should always be at the lowest point in the chamber, and at the same level or below the points of supply J, M, and P. The chambers A and B are connected together by the curved pipe L, and the chambers B and C by the curved pipe O. From the outlet Q of the last of the series of chambers the pipe R leads below the water of the reservoir T, and there expands into a bell-shaped opening, S.

The working of the apparatus is as follows: While the pipe or series of pipes leading from the source of supply to one or more of the pressure-chambers or to the reservoir are full of water, air is introduced through the air-supply pipe G by a pressure strong enough to raise the valve H against the pressure of the water. Then a large part of this air under pressure will go into a state of solution in the water; and, moreover, as the coefficient of solubility of the oxygen increases very rapidly with the increment of pressure, while the coefficient of solubility of the nitrogen increases slowly, the oxygen of the air will be more especially absorbed, and the excess of air over and above that which has gone into solution will contain relatively less oxygen and relatively more nitrogen than ordinary atmospheric air. This air-saturated water, together with the excess of air, is forced into the chamber A, where the air which has not already gone into solution will accumulate. The object of this chamber is to afford time and opportunity for the excess of air to be in contact with the water under great pressure, and thereby cause a renewed absorption of oxygen to take the place of that which has been used up in bringing about chemical changes in the organic matters of the water. From A the air-saturated water and the excess of air are forced through the curved pipe L into another chamber, B, in both of which absorption of oxygen and resultant chemical changes similar to those above detailed take place. From B the water and excess of air pass through the curved pipe O into the chamber C, and thence it will pass into the reservoir T through the pipe R, provided with a bell-mouthed opening, S. The greater the number of chambers A B, &c., the more complete will be the absorption of the oxygen by the water, and the greater will be the purification of the water; but the passage of the air and the water together under pressure through a single one of these chambers will accomplish far greater results than have been attained by the aeration of the earlier devices before mentioned.

In this apparatus, besides ordinary air, there may be used pure oxygen or the allotropic form of oxygen commonly called "ozone," or any mixture of oxygen or ozone with air, or with each other, according to the varied requirements of actual practice.

When my apparatus is connected with the water-mains of cities and discharges into reservoirs of great extent, it will be better to have the outlet-pipe R leading from the last chamber C branch out into a number of outlets each with a bell-shaped mouth, S, in order that the discharge of the excess of air may not be confined to one place.

The bell-shaped mouth S, although an advantage, is not an essential feature of my invention.

Having fully described my invention, that which I desire to claim and secure by Letters Patent is—

1. In an apparatus for the purification of water, the supply-pipe D, having the valve E, and the supply-pipe G, having valve H, and adapted to be connected to a suitable air-pump, combined with the chamber A, reservoir T, and outlet-pipe between said chamber and reservoir, substantially as and for the purpose described.

2. In an apparatus for the purification of water, a series of pressure-chambers, as A B, connected by the pipes, as L O, in combination with the water-supply pipe D and the air-supply pipe G, substantially as described.

ALBERT R. LEEDS.

Witnesses:
EDGAR EVERHART,
HENRY B. EVERHART.